Oct. 5, 1948.　　　　L. E. BLISS　　　　2,450,746
SAFELIGHT FILTER
Filed April 4, 1946
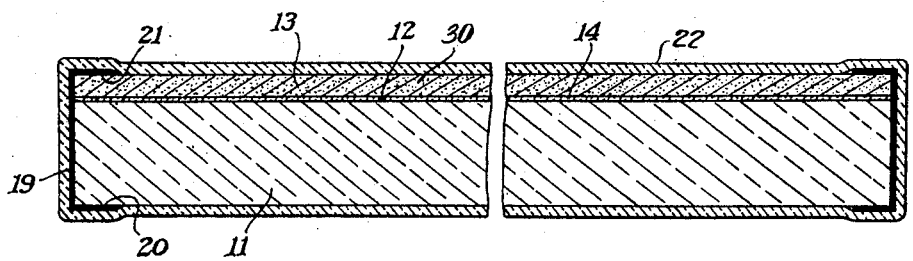
LESTER E. BLISS
INVENTOR Patented Oct. 5, 1948

2,450,746

UNITED STATES PATENT OFFICE 2,450,746

SAFELIGHT FILTER

Lester E. Bliss, Rochester, N. Y., assignor to Eastman Kodak Company, Rochester, N. Y., a corporation of New Jersey Application April 4, 1946, Serial No. 659,569

3 Claims. (Cl. 88—109)

The present invention relates to photography and more particularly to a safelight filter.

As is well known, safelight filters are often formed from a sheet of glass which is suitably colored or which is provided with a colored or dyed layer which will provide a light source which is not detrimental to sensitized photographic materials. The particular color employed depends of course, on the type of photographic material being used.

Such glass filters, obviously, are subject to breakage. In addition, the dyed layer may be damaged by water or processing liquids or by abrasions. Also the filter design may be such as to allow stray light rays to leak around the edges of the filter, the disadvantages of which will be readily apparent to those in the art.

The present invention has, therefore, as its principal object the provision of an envelop or overcoating for the filter which entirely encases the latter to thereby minimize breakage hazards.

A further object of the invention is the provision of an overcoating which protects the dyed layer against damage.

Still another object of the invention is the provision of edge light-lock means which effectively prevents light leaking around the edges of the glass filter.

To these and other ends, the invention resides in certain improvements and combinations of parts, all as will be hereinafter more fully described, the novel features being pointed out in the claims at the end of the specification.

In the drawing the figure is a longitudinal sectional view through a safe-light filter constructed in accordance with the preferred embodiment of the invention.

The figure shows a safelight filter constructed in accordance with the present invention and comprising a base member 11 formed of clear transparent glass or other suitable rigid material. One surface of the glass base member has coated thereon a gelatin layer 13 having incorporated therein a suitable dye. A subbing layer 14 may be provided between the glass surface 12 and the gelatin layer 13. A filter of the type so far described may be mounted in a channel formed in the safelight housing. As the latter may be of any suitable construction, the details thereof are not described and are not deemed necessary to a complete understanding of the present invention.

With such filters, it is very difficult, if not impossible, for the user to determine on which side of the glass sheet the dyed gelatin layer 13 is positioned. If, however, the user should inadvertently place the filter in the channel with the filter layer down, stray light rays may pass through the glass base and out of the edge thereof, and, after reflection from the side walls of the channel, may find their way past the front face of the filter. Such stray light will thus find its way around the edges of the filter without actually passing through the dyed filtering layer, the disadvantages of which are readily apparent to those in the art.

In order to prevent such a possibility, the present invention provides an edge light-lock for the filter. To secure this result, the edges of the glass plate 11, as well as the dye gelatin layer 13, are given an edge coating 19 of an opaque lacquer which extends about a quarter of an inch over the rear surface 20 of the glass plate 11 and the front surface 21 of the dyed gelatin layer 13, as clearly illustrated in the figure. By means of this opaque-lacquer edge-coating, stray light rays are eliminated and all rays must pass through the filtering layer 12, thus effectively protecting the photographic material being used.

As is well known, the surface 21 of the gelatin layer is subject to scratches or abrasions which may damage or even ruin the filtering quality of the layer. Also, the user may inadvertently place the filter, gelatin side down, on a table or support which is wet with water or processing solution which may seriously damage the gelatin layer. Also, the careless handling of the filter may leave undesirable fingerprints or marks thereon. Finally, an exposed gelatin layer may be subject to fungus and/or bacterial growth. In order to overcome these difficulties and to protect the easily damaged dyed gelatin layer, the present invention provides an arrangement for encasing the entire filter in a protective envelope or over-coating layer 22, preferably of clear transparent lacquer.

While any suitable type of lacquer may be used for this protective overcoating, it is preferred to utilize a gel-type lacquer of the type disclosed in the patent to Fordyce and Clarke, No. 2,350,742, issued June 6, 1944. This gel lacquer is used because a coating of the desired thickness can be secured in one application, while with other lacquers, several coatings would be required to secure the necessary thickness. In addition to affording a protective coating for the gelatin layer, this overcoating of gel lacquer also minimizes breaking hazards of the glass base 11, thus materially prolonging the life of the filter.

In filters of this type, in addition to providing a dyed layer which will transmit only light of the proper color, it is often desirable to provide light-diffusing means 30 to properly diffuse the light. Such light-diffusing means may be incorporated in any of the materials of the above-described filter, but is preferably incorporated in the dyed layer so that this layer carries both the dye-material and the light-diffusing material.

The present invention thus provides a filter which both filters and diffuses the light. In addition, the filter is coated to protect the easily damaged dyed gelatin layer and to minimize breakage hazards.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appending claims.

I claim:

1. A safelight filter comprising, a base member of rigid transparent material, a dyed gelatin layer on one surface of said base, an opaque lacquer layer covering the edges of said base member and gelatin layer to afford an edge light-lock therefor, and a light-transmitting lacquer coating completely encasing said base, gelatin and edge-lacquer layers.

2. A safelight filter comprising, a base member of rigid transparent material, a dyed gelatin layer on one surface of said base member, a layer of opaque lacquer completely covering all edges of said base member and said layer to afford an edge light-lock for said filter, and a clear gel-lacquer coating completely encasing said base member and said layers.

3. A safelight filter comprising, a clear glass base member, a gelatin layer on one surface of said glass and having a dye and light diffusing material incorporated therein, an opaque lacquer extending over all edges of said base member and said gelatin-layer to provide an edge light-lock for said filter, and a clear transparent gel-lacquer coating completely encasing said base members and said gelatin and opaque layers.

LESTER E. BLISS.

REFERENCES CITED

The following references are of record in the file of this patent:

UNITED STATES PATENTS

| Number | Name | Date |
| --- | --- | --- |
| 1,411,677 | Trivelli | Apr. 4, 1922 |
| 1,889,124 | Kelley | Nov. 29, 1932 |
| 2,075,153 | Wilmanns | Mar. 30, 1937 |

FOREIGN PATENTS

| Number | Country | Date |
| --- | --- | --- |
| 551,473 | Great Britain | June 16, 1942 |

OTHER REFERENCES

Clerc, "Photography; Theory and Practice," 2nd edition, published in 1937 by Sir Isaac Pitman & Sons, Ltd., page 78, the first paragraph under "Light-filters," and page 80, footnote 3 cited.